(12) United States Patent
de Groot et al.

(10) Patent No.: US 7,395,653 B2
(45) Date of Patent: Jul. 8, 2008

(54) SYSTEMS AND METHODS FOR AUTOMATICALLY PICKING AND CORING LETTUCE AND CABBAGE

(75) Inventors: Peter de Groot, Salinas, CA (US); Jason Tracy, Salinas, CA (US); Fred Willoughby, Watsonville, CA (US)

(73) Assignees: Valley Fabrication Inc., Salinas, CA (US); Willoughby Farms, Inc., Watsonville, CA (US)

( * ) Notice: Subject to any disclaimer, the term of this patent is extended or adjusted under 35 U.S.C. 154(b) by 78 days.

(21) Appl. No.: 11/592,033

(22) Filed: Nov. 1, 2006

(65) Prior Publication Data

US 2007/0095041 A1 May 3, 2007

Related U.S. Application Data

(60) Provisional application No. 60/733,129, filed on Nov. 2, 2005.

(51) Int. Cl.
*A01D 45/00* (2006.01)
(52) U.S. Cl. .................. 56/327.1; 99/547; 426/484
(58) Field of Classification Search ............... 99/547, 99/544, 563, 642, 538; 426/484, 481, 482, 426/472, 324, 321; 53/448, 240, 537, 391, 53/127; 171/61, 38, 26; 134/68, 126; 56/327.1
See application file for complete search history.

(56) References Cited

U.S. PATENT DOCUMENTS

| | | | | |
|---|---|---|---|---|
| 2,699,877 A * | 1/1955 | Huston | ................ | 414/523 |
| 3,194,318 A * | 7/1965 | Boyer | ................ | 171/18 |
| 3,731,477 A * | 5/1973 | Coon | ................ | 56/327.1 |
| 3,754,470 A * | 8/1973 | Console | ................ | 99/538 |
| 3,821,987 A * | 7/1974 | Shepardson et al. | ................ | 171/61 |
| 4,136,509 A * | 1/1979 | Lenker et al. | ................ | 56/327.1 |
| 4,176,595 A * | 12/1979 | Shaw | ................ | 99/638 |
| 4,453,458 A * | 6/1984 | Altman | ................ | 99/544 |
| 5,121,589 A * | 6/1992 | Ventura et al. | ................ | 53/448 |
| 5,316,778 A * | 5/1994 | Hougham | ................ | 426/324 |
| 2003/0217650 A1 * | 11/2003 | Herrera | ................ | 99/547 |
| 2004/0187467 A1 * | 9/2004 | Garcia et al. | ................ | 56/328.1 |
| 2005/0112256 A1 * | 5/2005 | Mitchell et al. | ................ | 426/518 |

* cited by examiner

*Primary Examiner*—Árpád Fábián-Kovács
(74) *Attorney, Agent, or Firm*—Townsend and Townsend and Crew LLP; Gerald T. Gray

(57) ABSTRACT

Apparatus and methods for picking and coring produce heads. A righting mechanism receives and orients planted produce heads, and when a planted head is in a position to be severed, a lift arm and clamp wheel are controlled to position a clamp proximal to the planted head, wherein the planted head is clamped and a severing mechanism severs the planted head from the soil bed. The lift arm and clamp wheel operate to automatically reposition the clamped and severed head proximal to a coring mechanism, and the coring mechanism automatically removes the core of the clamped and severed head.

21 Claims, 16 Drawing Sheets

Clamp Head 27
28

Clamp Assembly 25

Cut Mechanism 37

Coring Mechanism 40

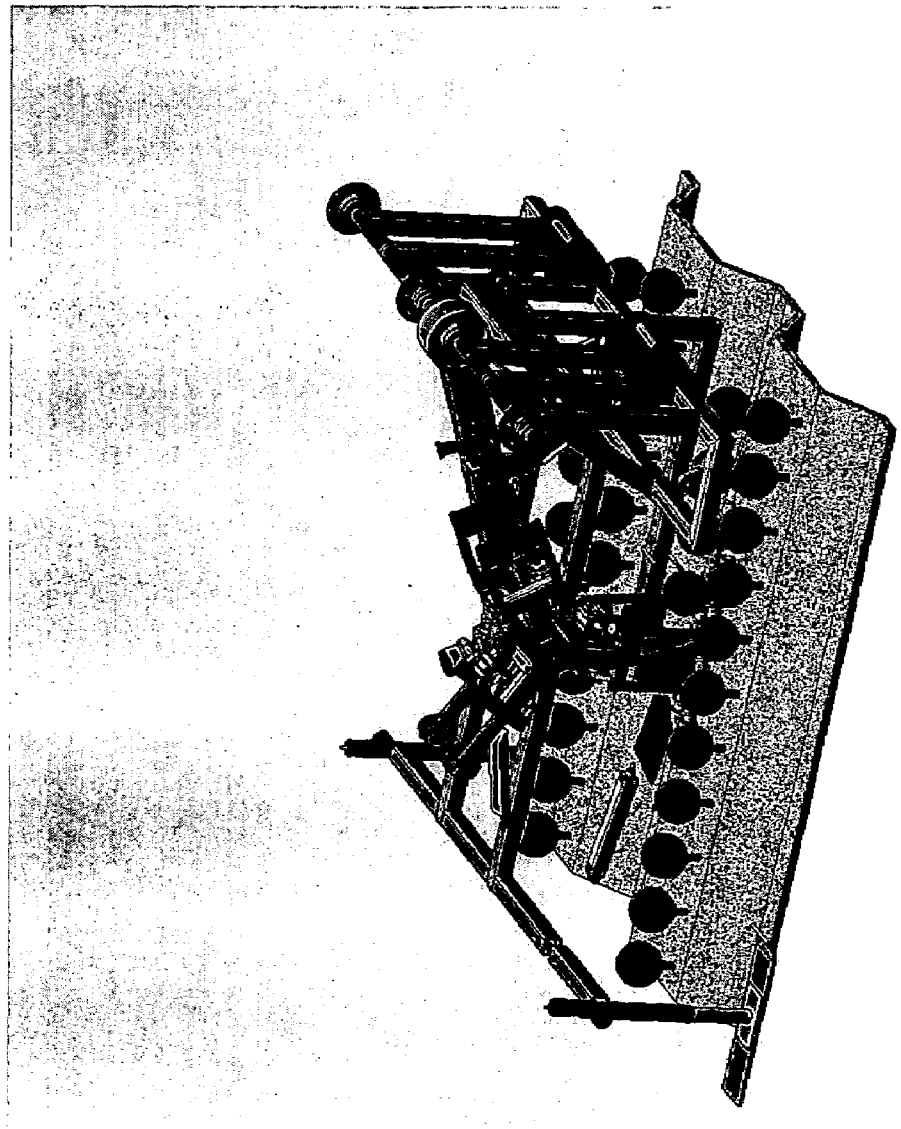
FIG. 5 (Clamping)

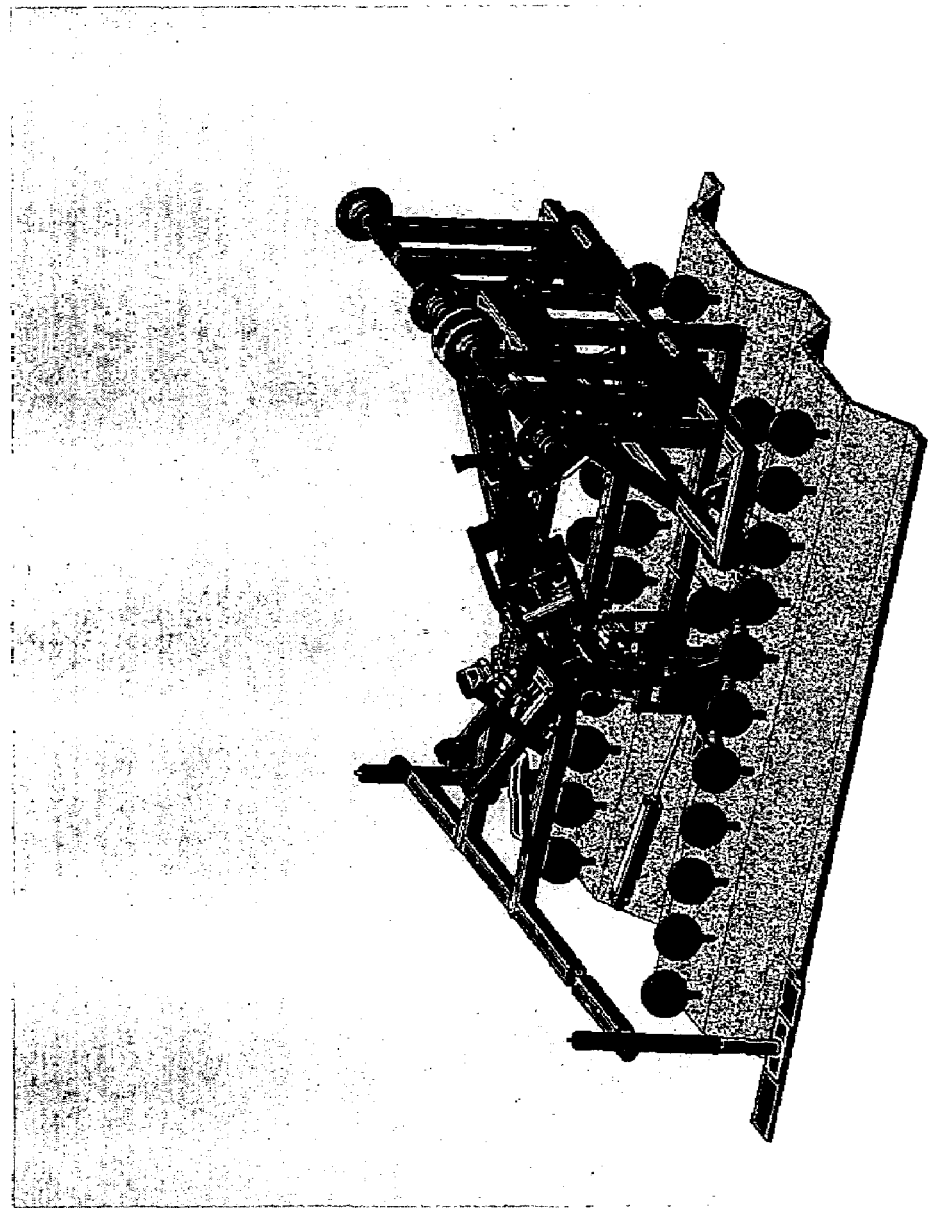
FIG. 6 (Cutting)

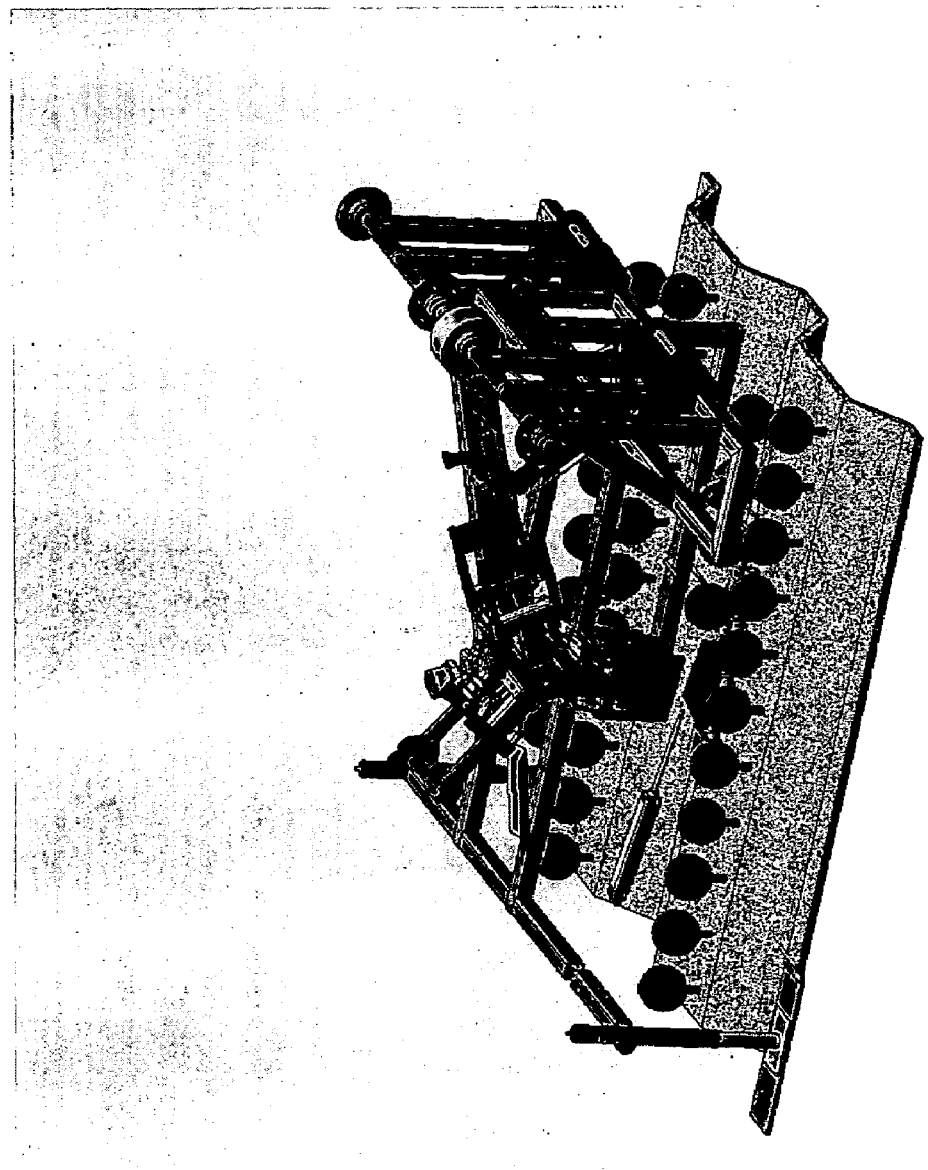
FIG. 7 (Lifting)

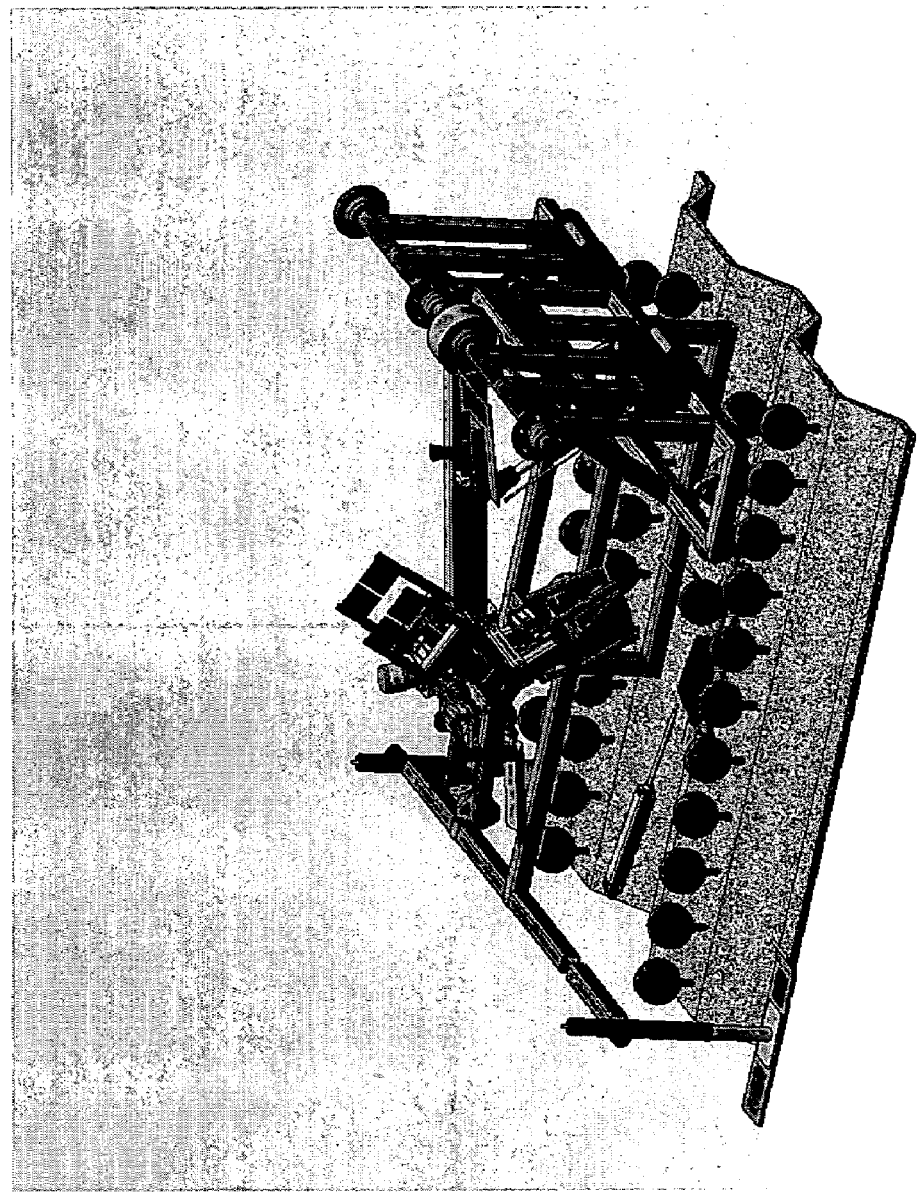
FIG. 8 (Rotating-Lifting)

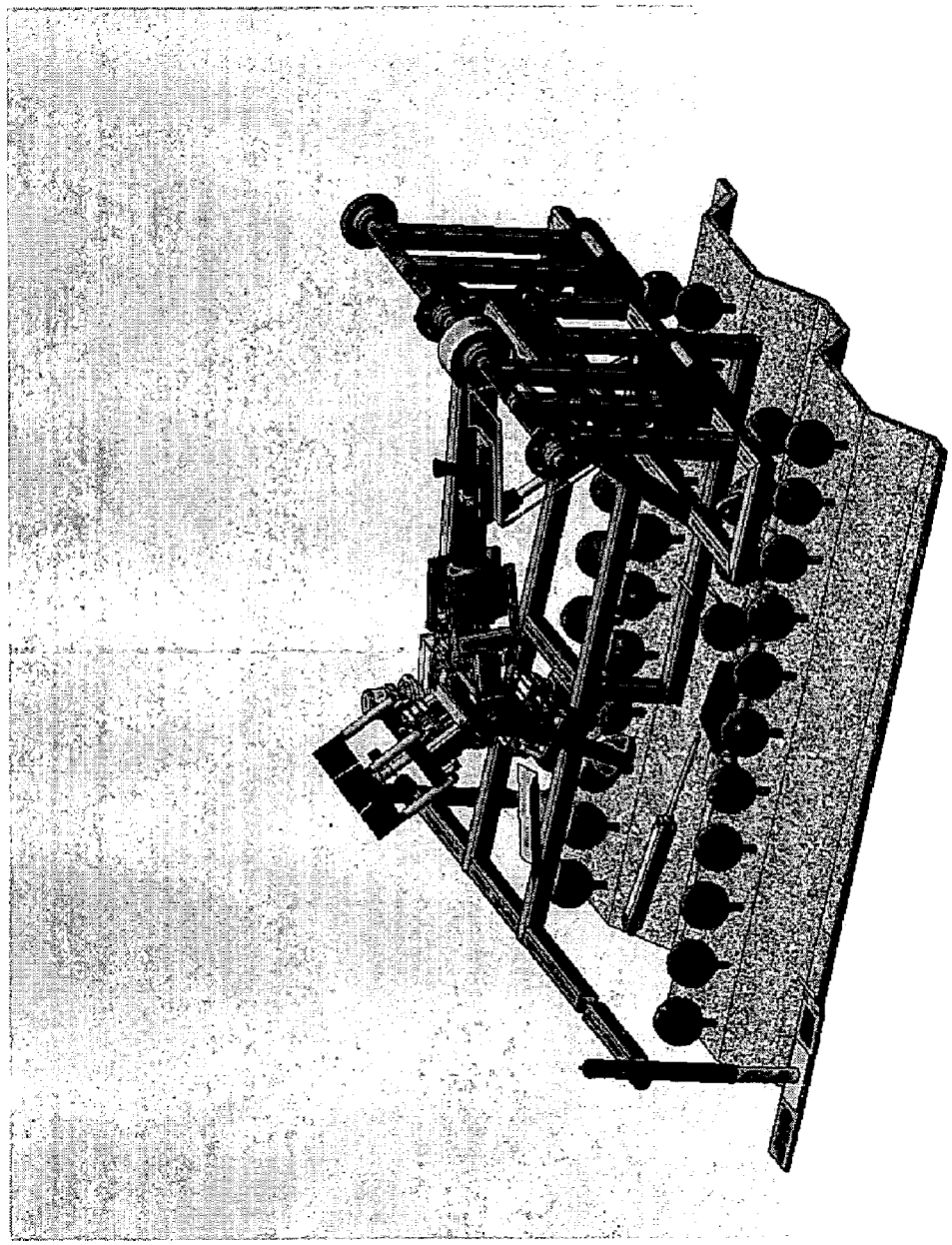
FIG. 9 (At Coring Station)

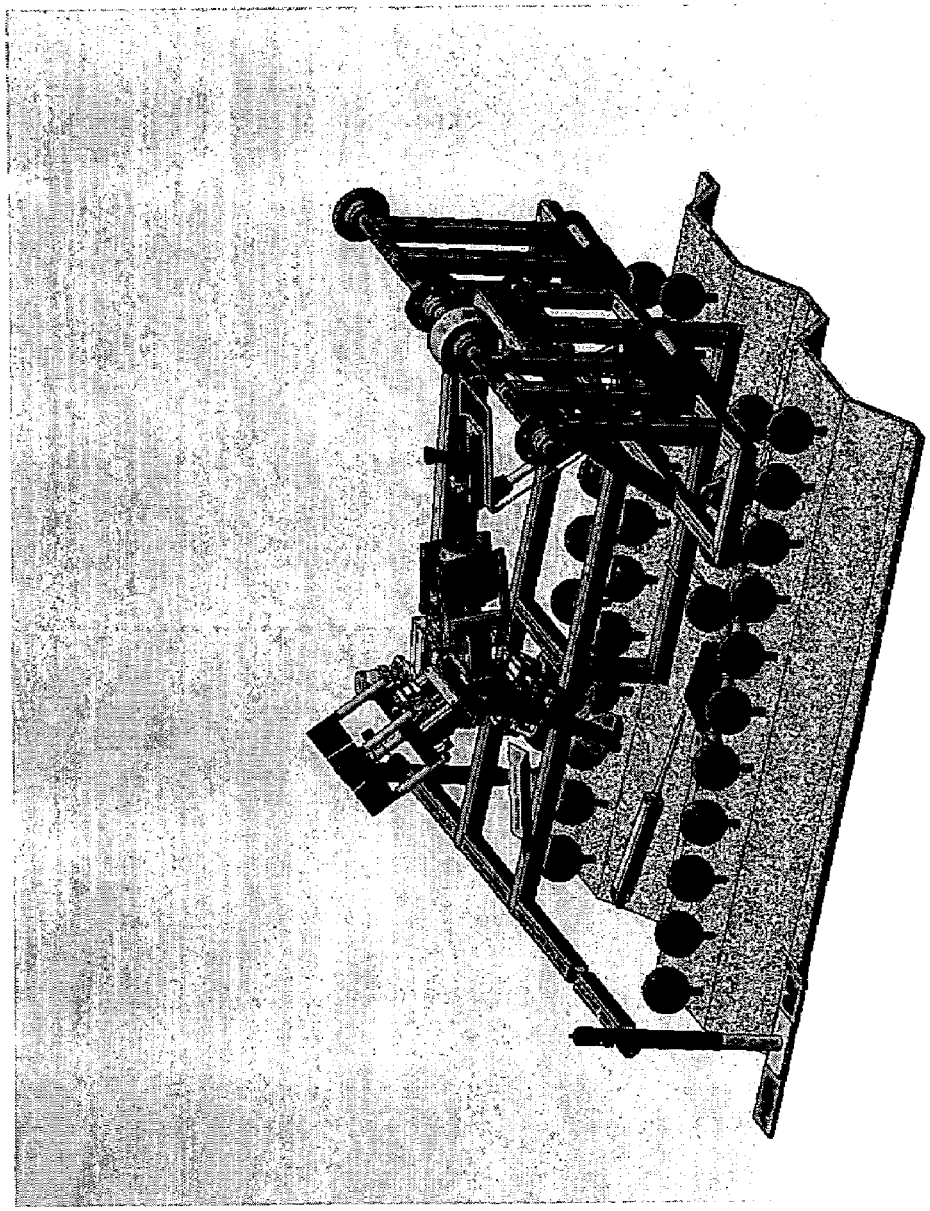
FIG. 10 (Coring)

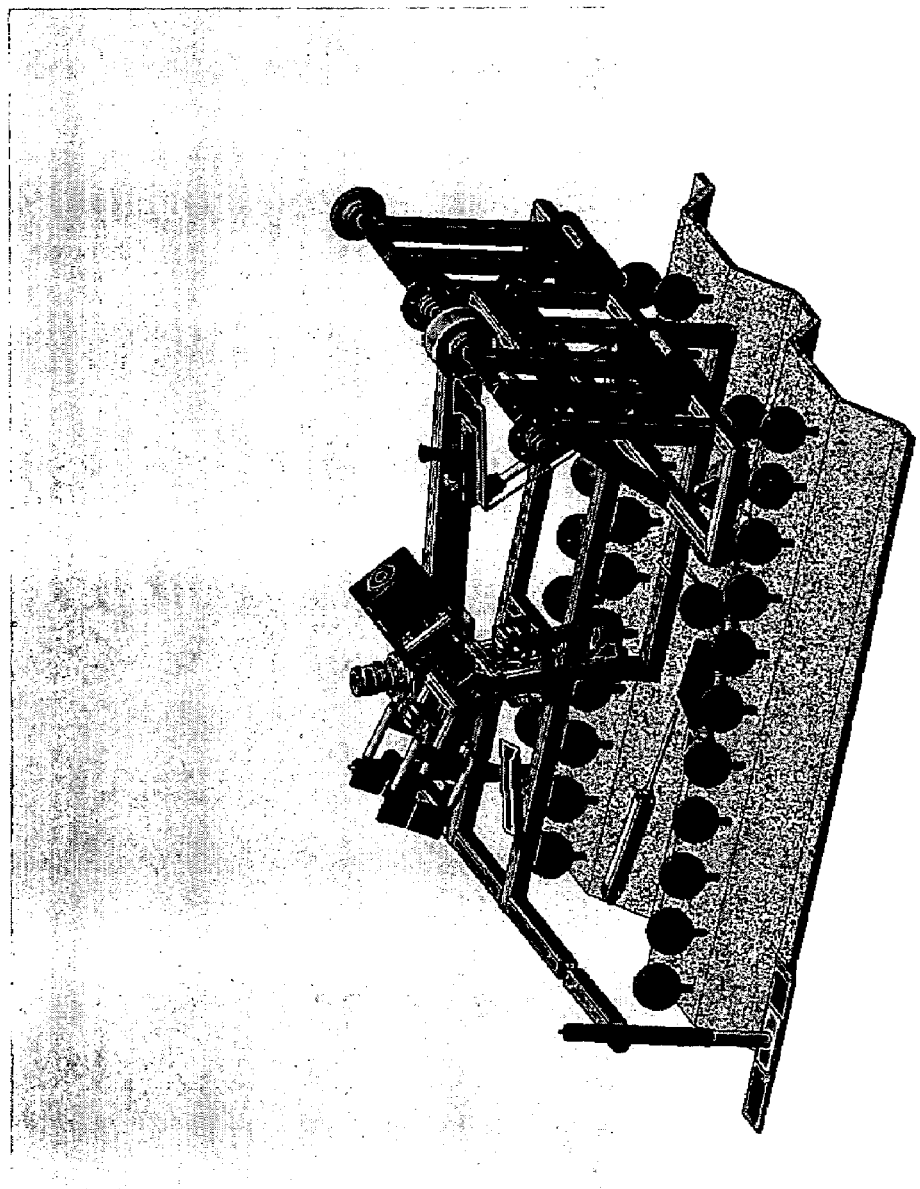
FIG. 11 (Rotating)

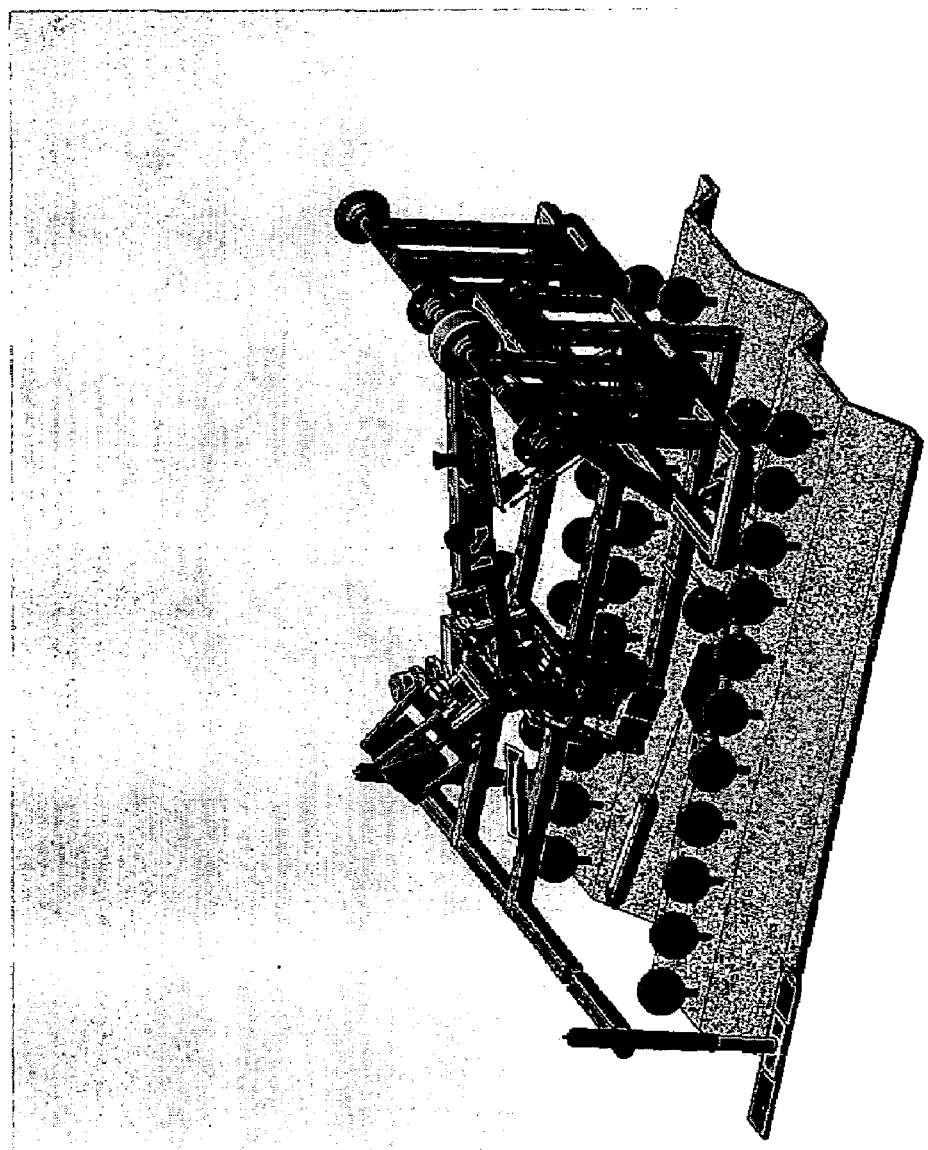
FIG. 12 (Lowering)

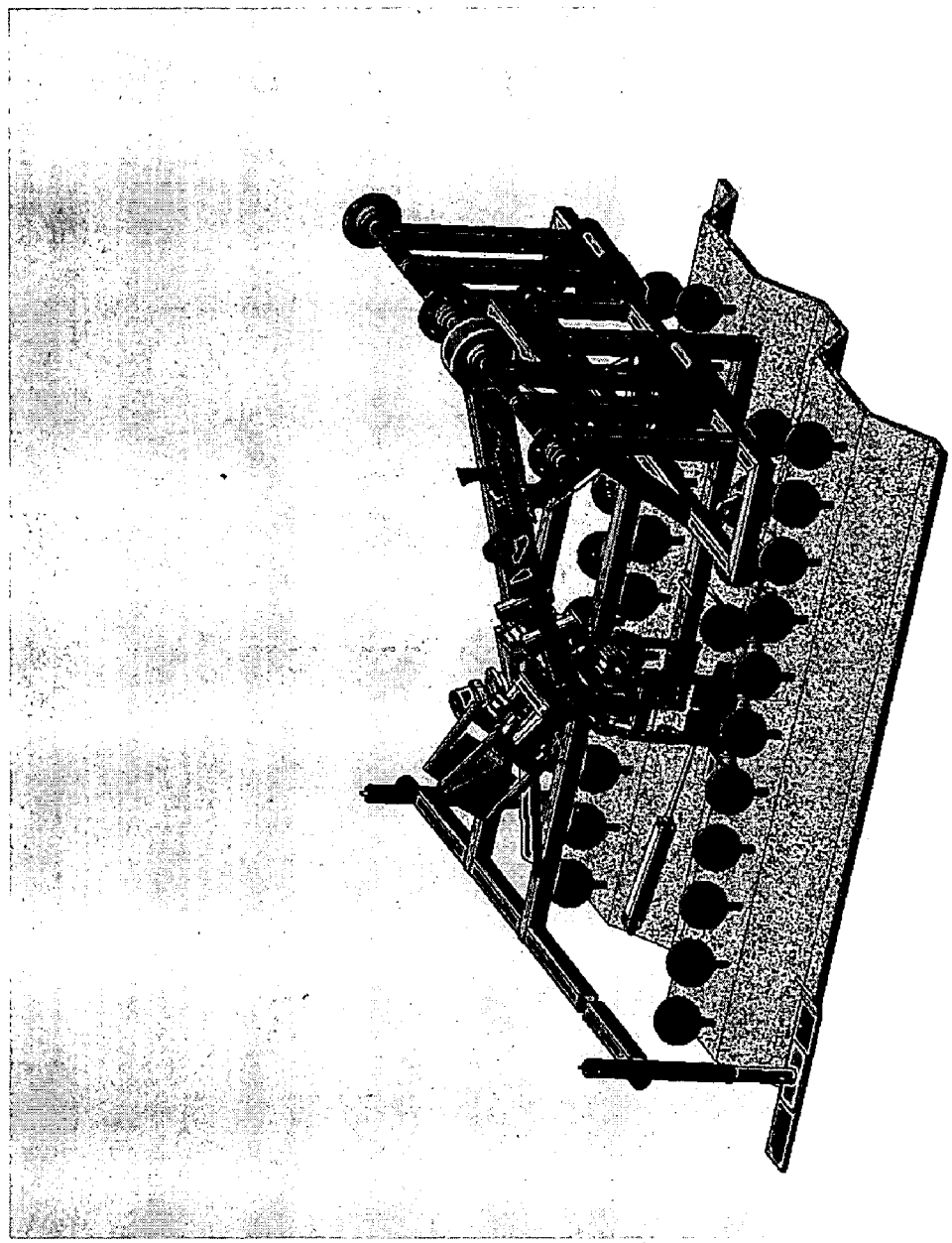
FIG. 13 (Just Before Release)

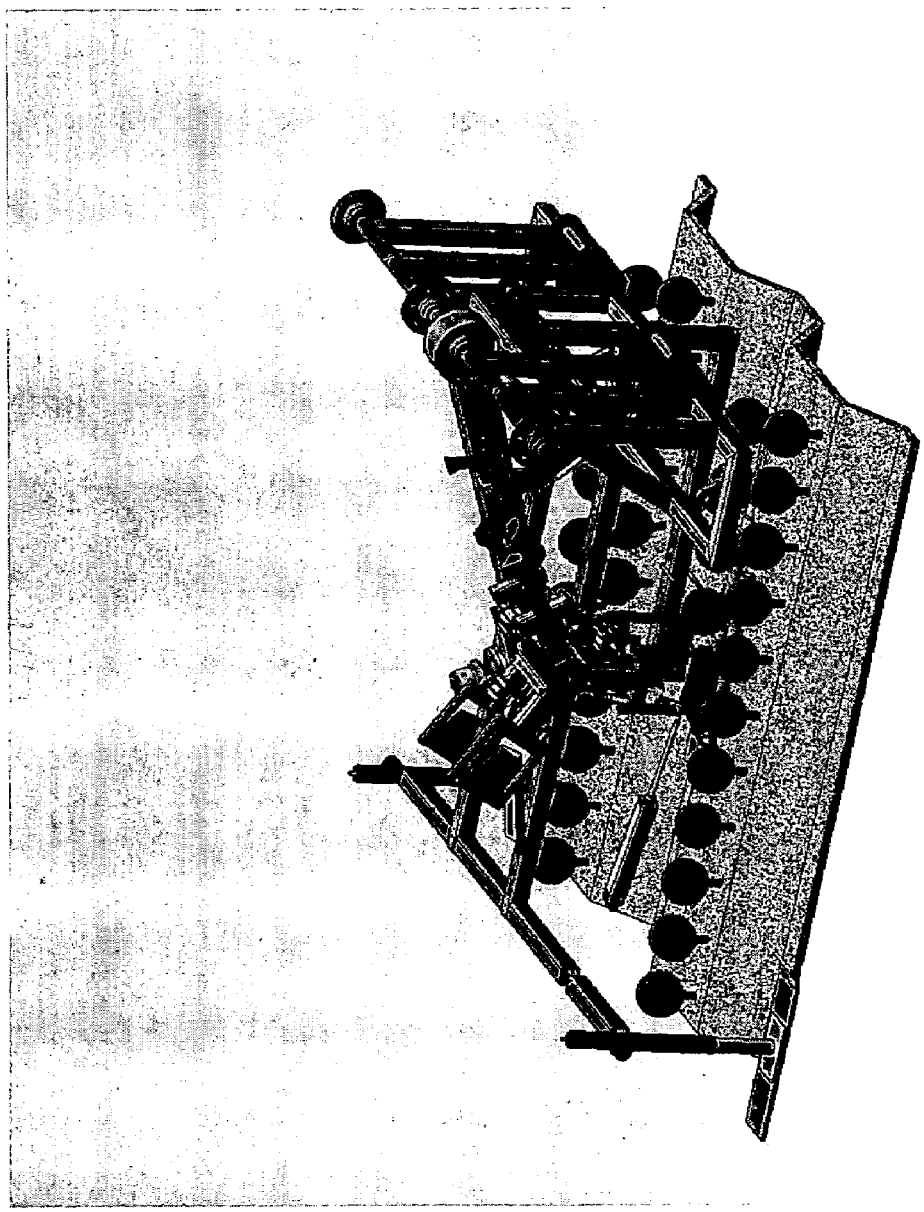
FIG. 14 (Released)

SYSTEMS AND METHODS FOR AUTOMATICALLY PICKING AND CORING LETTUCE AND CABBAGE

CROSS-REFERENCES TO RELATED APPLICATIONS

This application claims the benefit of U.S. Provisional Application No. 60/733,129, filed Nov. 2, 2005, the disclosure of which is incorporated herein by reference in its entirety.

BACKGROUND OF THE INVENTION

The present invention relates generally to systems and methods for harvesting produce, and more particularly to systems and methods for automatically picking and coring cabbage, head lettuce and other similar produce.

Head lettuce (e.g., iceberg) and cabbage are most often cut using manual labor. This involves an agricultural worker reaching down to the ground and cutting the plant an appropriate distance up from the ground.

In many growing areas in the United States, iceberg lettuce and cabbage are harvested for one of two purposes. The product may be cut from the field and packaged as a whole head and find its way to a fresh market. Alternatively, the heads may be further processed into various precut packaged salad blends, coleslaw, or sauerkraut. Harvesting for the latter is sometimes referred to as "bulk" harvest, as the cut heads are typically collected in large volume bins and further handled as a bulk item. Many salad producers are requiring that field harvesters provide the heads of iceberg or cabbage with the cores removed ("cored"). The core or stem of the plant is considered undesirable for use in salads or coleslaw. The salad producers prefer that the product be pre-cored so that substantially all of the raw product delivered to their processing facility is usable. Hence, there is increasing economic pressure to remove the iceberg and cabbage cores prior to being sent or delivered to the processing plant. There are several cutting devices available to assist the agricultural field workers in removing the core from the plants. Regardless of which current devices are used, however, the entire process is still labor intensive.

Accordingly, it is desirable to provide automated systems and methods for picking and coring such produce to enhance efficiency and/or to help reduce reliance on manual labor.

BRIEF SUMMARY OF THE INVENTION

The present invention provides systems and methods for automatically picking and coring cabbage and lettuce. Aspects of the present invention take advantage of the fact that with modern farm growing practices the plant line location on the bed is precisely controlled. Plants may tend to lean outward on the bed as they start to grow, and the stem (or core) may grow out from the known seed line. By "righting" the plant to compensate for a leaning stem before cutting, the stem (or core) is positioned or repositioned to a vertical orientation. Thus, the stem is accurately brought to a known position prior to severing from the root so that the core can be completely removed. A clamping mechanism preserves this orientation, and delivers the oriented head to a coring station for core removal. In certain aspects, coring the head is facilitated by precise robotic movements. The cored head is then delivered to a drop station where the head is released.

According to one aspect of the present invention, an apparatus for picking and coring produce heads is provided. The apparatus typically includes a chassis, a rotating clamp wheel having one or more clamps, each configured to hold a produce head, a lift arm that couples the clamp wheel with the chassis, wherein the lift arm is configured to controllably raise and lower the clamp wheel, a righting mechanism configured to position a planted produce head in a vertical orientation, and a trigger mechanism that detects when a planted head is in a position to be severed. The apparatus also typically includes a severing mechanism configured to sever a planted produce head from a soil bed, and a coring mechanism configured to remove a core of a clamped produce head. In typical operation, as the apparatus travels along a soil bed, the righting mechanism receives and orients planted produce heads, wherein when a planted head is in the position to be severed, the lift arm and clamp wheel are controlled to position a clamp proximal to the planted head, wherein the planted head is clamped and the severing mechanism severs the planted head from the soil bed, wherein the lift arm and clamp wheel re-position the clamped and severed head proximal to the coring mechanism, and wherein the coring mechanism automatically removes the core of the clamped and severed head.

According to another aspect of the present invention, a method is provided for automatically picking and coring produce heads with a picking and coring apparatus configured to travel along a soil bed containing planted produce heads. The method typically includes receiving a produce head in a pair of righting screws configured to hold the produce head into a vertical orientation, detecting when the produce head is in a desired location; and thereafter automatically clamping the produce head when the head is in the desired location and severing the produce head when the head is in the desired location. The method also typically includes re-positioning the clamped produce head proximal to a coring mechanism, removing the core of the clamped produce head with the coring mechanism, re-positioning the clamped and cored produce head proximal to a drop station; and releasing the cored produce head. In certain aspects, the righting screws are configured to re-orient a produce head to a vertical orientation.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 2b illustrates a different perspective view of the coring and picking apparatus of FIG. 2a. FIG. 2b also illustrates a start position for a produce picking and coring cycle according to one embodiment.

FIG. 5 illustrates a clamp wheel in a lowered position so that a clamp is positioned proximal a head to be picked according to one embodiment.

FIG. 6 illustrates operation of a severing mechanism according to one embodiment.

FIG. 7 illustrates operation of the clamp wheel lifting while a clamp is holding a severed head according to one embodiment.

FIG. 8 illustrates operation of the clamp wheel lifting and rotating while a clamp is holding a severed head according to one embodiment.

FIG. 9 illustrates operation of the clamp wheel with a clamped head positioned in the coring station, e.g., proximal to the coring drill, according to one embodiment.

FIG. 10 illustrates operation of the coring station according to one embodiment.

FIG. 11 illustrates operation of the clamp wheel rotating with a clamp holding a cored head according to one embodiment.

FIG. 12 illustrates operation of the clamp wheel lowering with a clamp holding a cored head in the vicinity of a drop station according to one embodiment.

FIG. 13 illustrates the position of the clamp wheel, and clamp holding a cored head proximal to the coring station just before release of the cored head according to one embodiment. Another clamp is also in position to clamp a head in the soil bed.

FIG. 14. illustrates release of the cored head onto the drop station.

DETAILED DESCRIPTION OF THE INVENTION

Figure 1A:
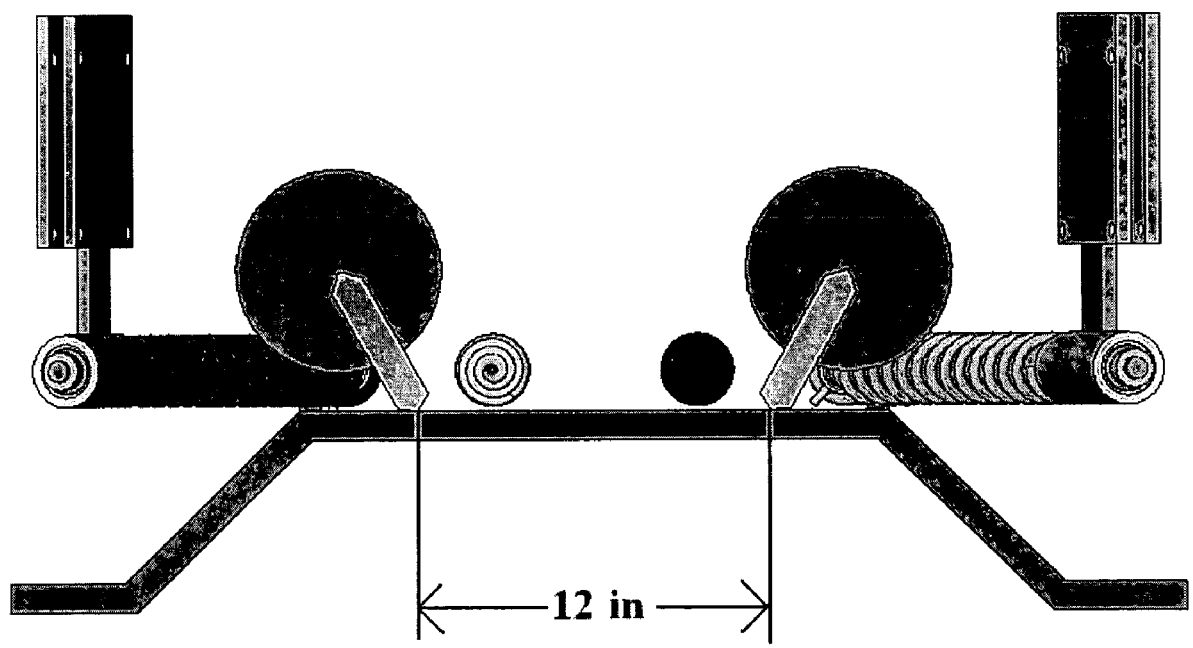
FIGS. 1a and 1b illustrate planted produce heads in a leaning orientation (stems not vertical) and in a righted, vertical orientation, respectively.
Figure 1:
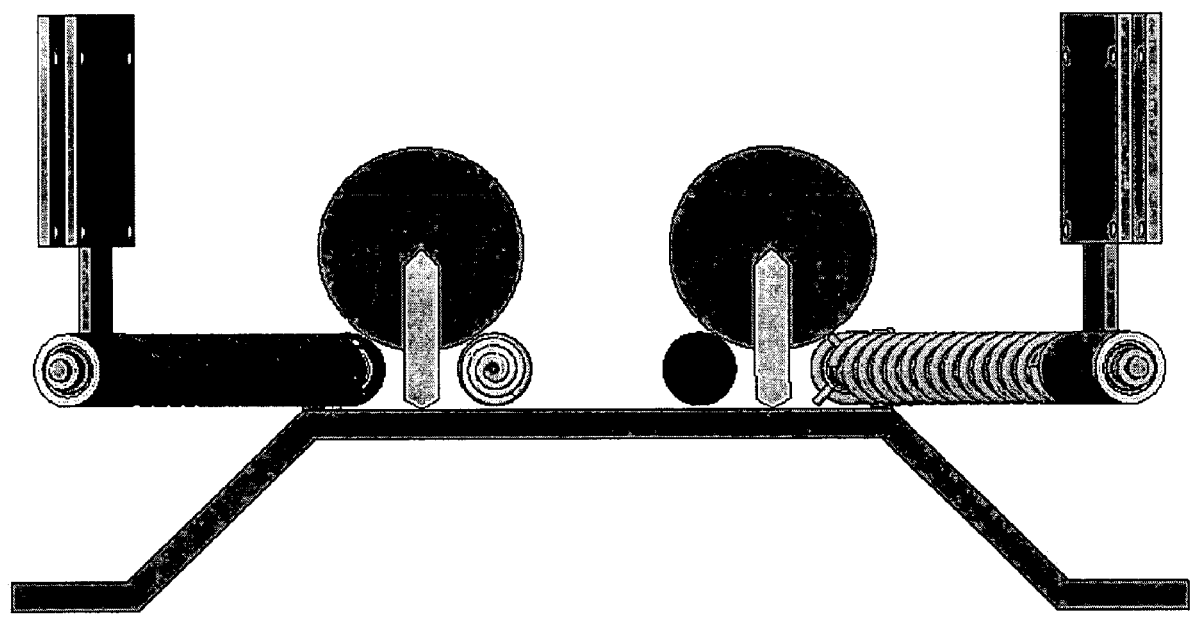

The present invention provides systems and methods for picking and coring cabbage and head lettuce. In one embodiment, a picking and coring device is configured to travel along a planted row of cabbage or head lettuce and automatically, or semi-automatically, pick and core plants. Any plant that is leaning, or has grown away from its original position and orientation on the bed as shown in FIG. 1a is righted, so that it is vertical and substantially centered over it's original growing position as shown in FIG. 1b. Thus righted, the plant's core or stem is in a known orientation (e.g., vertical). A trip mechanism or sensor detects the leading edge of the stem, which then initiates a cycle of the machine. The cycle includes, in one embodiment, clamping around the head followed by severing the plant at an appropriate cut height. The clamped and severed head is then lifted and repositioned, e.g., a clamp wheel rotates a precise interval (for example, 120 degrees), to position the clamped head proximal to a coring station. When the clamping wheel comes to rest, the stem of the gripped plant is precisely oriented with respect to a coring mechanism (e.g., core extending radially outward from center axis of clamp wheel). A core removal drill is then activated and plunges into the core material and retracts before the next cycle is initiated. Thus, the core material is removed from the head. On the next cycle the clamping wheel is advanced a precise interval (e.g., 120 degrees). At the next station, the clamp is released and the head falls by gravity onto a slide and into a receiving conveyor, which then transports the cored head to a bulk container.

Figure 2A:
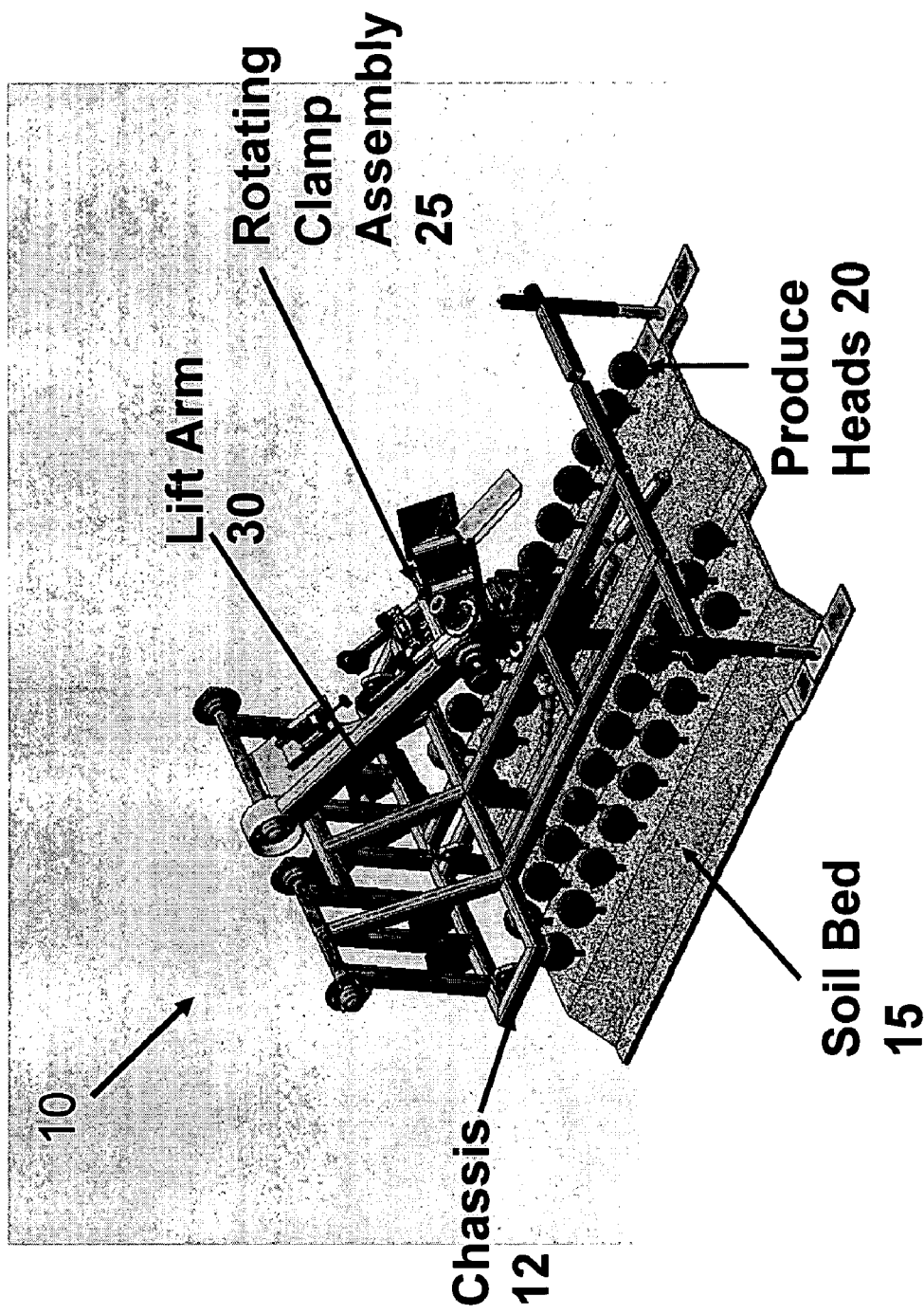
FIG. 2a illustrates a perspective view of a coring and picking apparatus according to one embodiment.
Figure 2B:
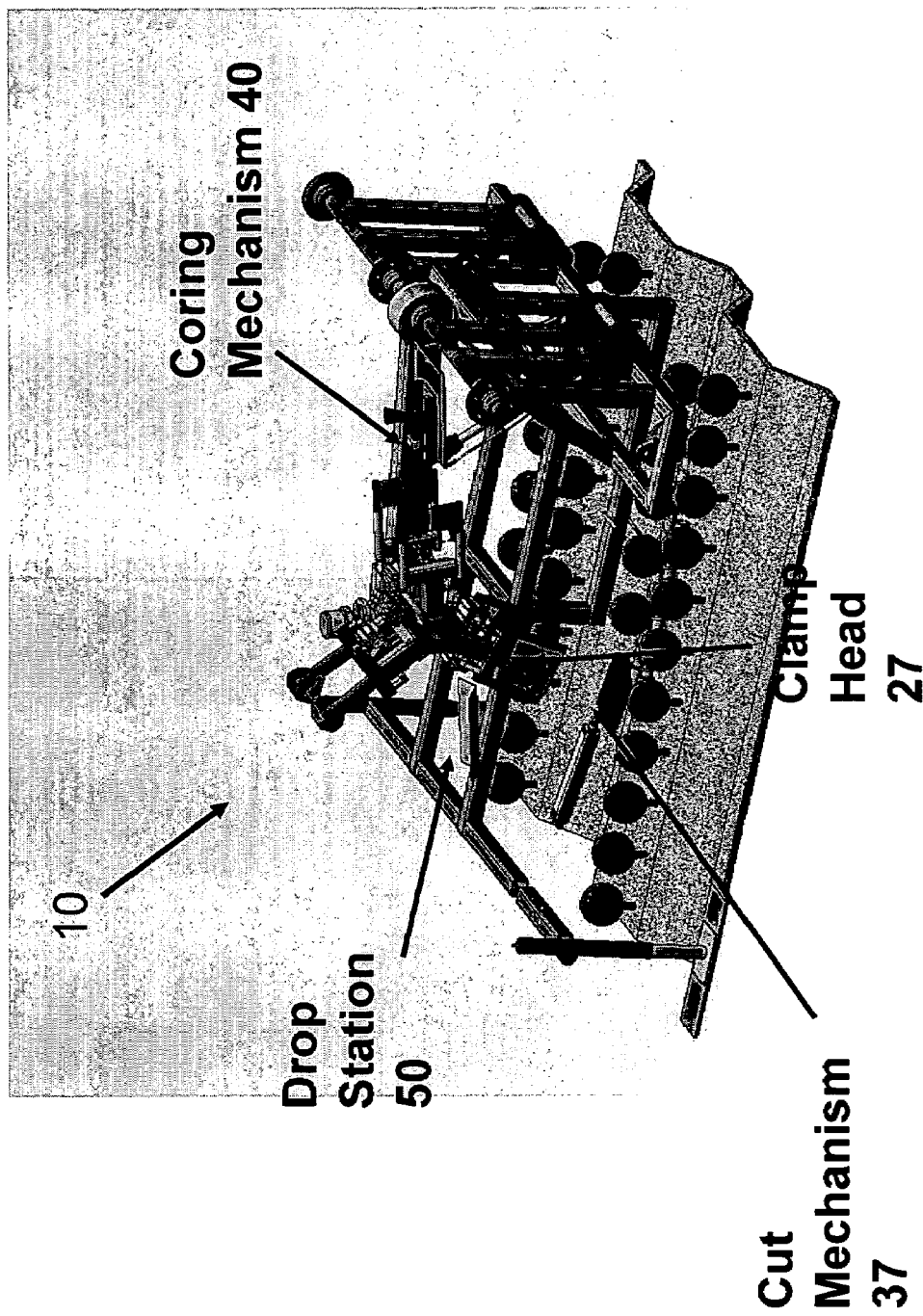

FIG. 2a illustrates a perspective view of a coring and picking apparatus 10 according to one embodiment. FIG. 2b illustrates a different perspective view of the coring and picking apparatus 10 of FIG. 2a. A chassis 12 is provided to hold various device components. As shown, device components include a lift arm 30 coupled to a rotating clamp assembly 25 that includes one or more clamp heads 27. Chassis 12 in one aspect includes wheels (not shown) so that apparatus 10 may travel along a soil bed 15 to pick and core produce heads 20 (e.g., cabbage and head lettuce). Apparatus 10 may be self-propelled, e.g., include an engine, gears and a steering mechanism, or it may be propelled by another device, such as a tractor. For example, chassis 12 may be configured to attach to a tractor so that a tractor may push (or pull) the apparatus along a soil bed 15.

Figure 3:
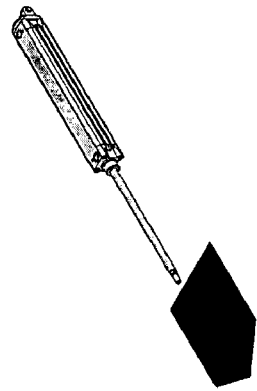
FIGS. 3 and 4 illustrate individual components of the apparatus of FIGS. 2a and 2b.
Figure 3:
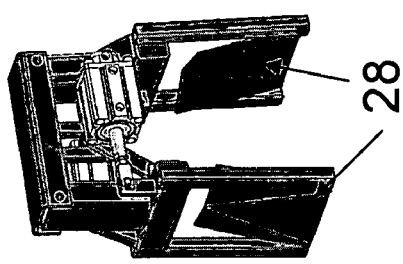
Figure 3:
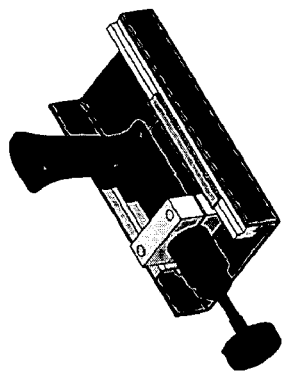
Figure 3:
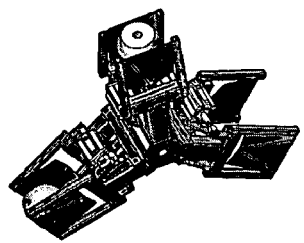
Figure 4:
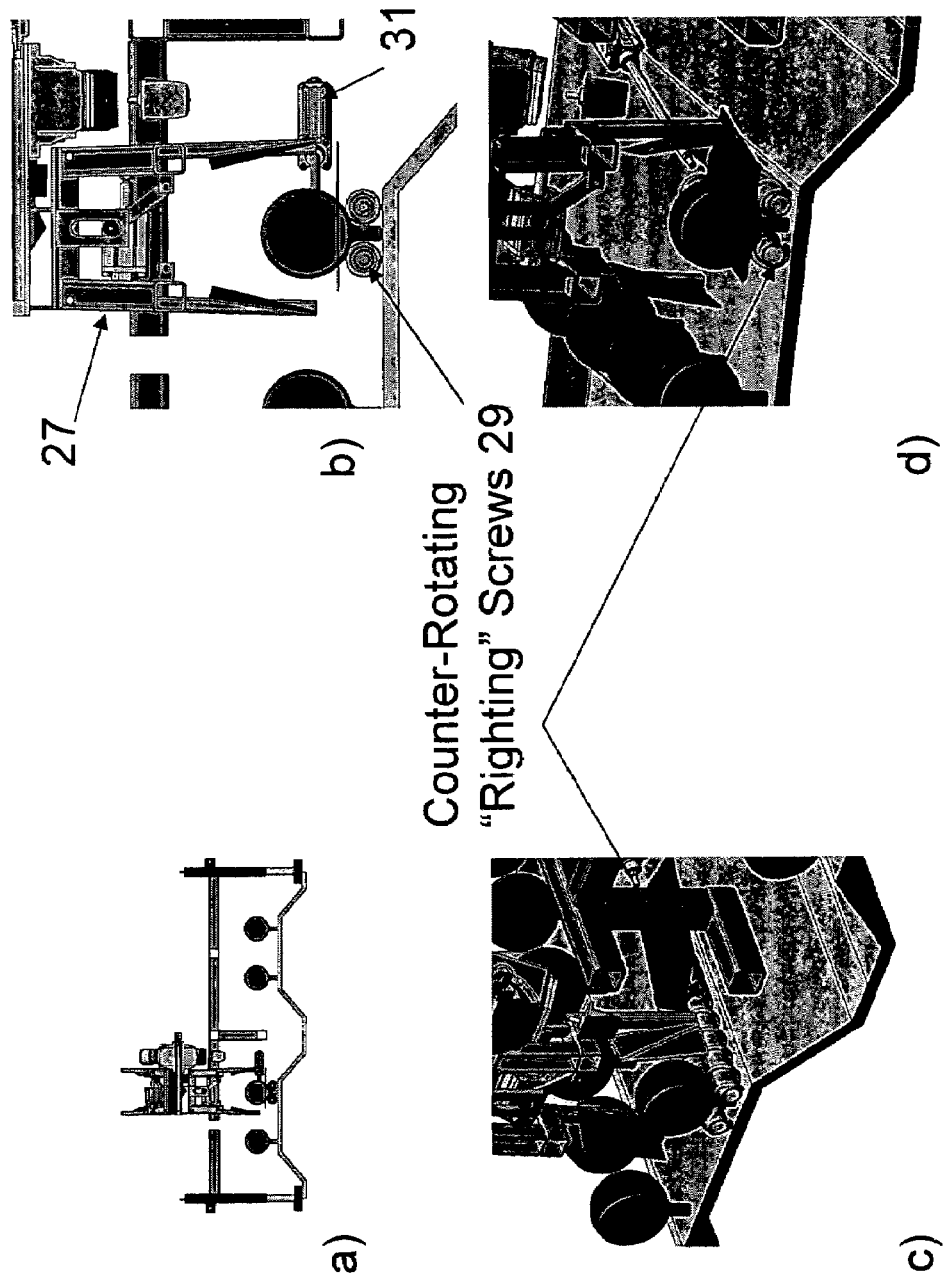

As shown in FIG. 2b, apparatus 10 also includes a cut mechanism 37 for severing clamped produce heads, a coring drill 40 that cores clamped heads and a drop station 50 for receiving cored heads released by a clamp head 27. FIGS. 3 and 4 illustrate individual components of the apparatus 10 of FIGS. 2a and 2b. In one embodiment as shown, clamp assembly 25 includes three clamp heads 27 oriented at approximately 120° relative to a center of clamp assembly 25 (also referred to herein as "clamp wheel"), however, one skilled in the art will appreciate that fewer than three clamp heads 27 may be used, and that greater than three clamp heads 27 may be used. In certain aspects, clamp wheel 25 rotates about its center to facilitate positioning of clamp heads 27 at desired positions, e.g., proximal to a head in soil bed 15, proximal to coring mechanism 40 and proximal to drop station 50. In one aspect, clamp wheel 25 operates in conjunction with lift arm 30 to position the clamp heads 27 at the desired positions as will be described in more detail below.

With reference to FIG. 3, in certain aspects, each clamp head 25 includes a pair of gripper elements 28. Clamp head 27 includes a clamping mechanism that is configured to move the pair of gripping elements 28 toward each other so as to grip a head. Each gripper element 28 may be flat or it may have a sloped, cupped configuration to facilitate gripping and retention of a head. In one aspect, each gripper element is pivotally attached to clamp head 27 so that the gripper elements may pivot or flex to facilitate gripping and retention of a round or oblong-shaped head. The clamping mechanism in one aspect includes an electric motor or a hydraulic actuator configured to clamp and release gripper elements 28.

According to one embodiment, apparatus 10 include a righting mechanism 29 configured to re-orient to a vertical orientation any planted heads that may be leaning away from a vertical orientation. In one embodiment, righting mechanism 29 includes a pair of righting screws as shown in FIG. 4. In one aspect, the screws are oriented parallel to the surface of the soil bed 15 and are positioned at an appropriate distance from an edge of the soil bed so as to line up with the seed line. The righting screws, in one aspect, are counter-rotating and have a pitch that matches ground speed of apparatus 10 as it travels along soil bed 15. As apparatus 10 travels along the soil bed 15, the righting screws operate to re-orient to a vertical orientation any produce heads that are leaning away from a vertical orientation. With reference to FIGS. 1a and 1b, two pairs of righting screws are shown righting the orientation of produce heads on two seed lines spaced a known distance apart, e.g., 12 inches. As shown therein, in one aspect, at least one screw of a pair includes an extended portion that is angled away from the seed line so as to facilitate gathering and righting of a produce head that may be leaning. The remaining portions of both screws are substantially parallel to each other (also parallel to the seed line) so as to guide the righted heads to the trip mechanism or position sensor.

In certain aspects, apparatus 10 is equipped with a follower device (not shown) that detects the height of the soil bed and provides feedback signals to control the height of the righting mechanism 29, e.g., righting screws, to accommodate for variations in height of the soil bed 15. In other aspects, the height of the righting mechanism 29, e.g., screws, is manually adjustable. In other embodiments, the righting mechanism may include a driven chain (e.g., driven at ground speed of the apparatus) and a rotating wheel configured to lift or right a head to be vertical over its growing position. The wheel may be parallel to or angled with respect to horizontal, e.g., a plane of the soil bed. In certain aspects, shortened worm screws may be used with the drive chain and wheel for maintaining a righted head in the righted position/orientation.

Once righted, a head enters a cut station where the heads are clamped and severed. The cut station refers to a region or location proximal to cut mechanism 37. FIG. 4 illustrates a righted head positioned in a cut station. In one aspect, the heads are clamped and then severed, however, in other aspects, the heads may be severed prior to, or simultaneously as, clamping by a clamp head 27. To clamp a head, lift arm 30 is configured to lower (e.g., using hydraulic actuators coupled with the chassis) the clamp wheel 25 and clamp wheel 25 is configured to rotate, if necessary, to position a clamp 27 proximal the cut station or region, and thus proximal a head in the cut region. Clamping of a produce head prior to severing helps ensure that any head leaning in a direction parallel to the direction of screws 29 are righted to a vertical orientation.

Cut mechanism 37 in one embodiment includes one or more blades configured to sever a clamped head at a desired location. A blade may be electronically or hydraulically controlled to plunge into or sweep across a clamped head so as to sever the head. For example, with a fixed blade, the coring mechanism in one aspect is controlled to plunge into the core or to sweep across the core, thereby severing the head from the root. Alternatively or additionally, the cut mechanism can include one or more fixed or movable rotating blades. FIGS. 4b and 4d show a blade cutting a head at a desired height.

According to one embodiment, apparatus 10 includes a trip mechanism configured to detect when a righted produce head is located in the cut station and ready to be severed. The trip mechanism in one embodiment includes an element that provides a trigger signal when a produce head is detected in the appropriate location. For example, in one aspect, the trigger element includes a pass-by trigger bar 31 that activates either upon contact with a head or after a head has moved the bar a certain distance. The trigger bar may be attached to chassis 12 and positioned to detect the leading edge of the head, or of the head root, or somewhere in between. It should be appreciated that other trigger or sensor mechanisms may be used, such as for example, a visual sensor, a gamma ray emitting and detecting device, etc., and that the trigger mechanism may be located on other elements of apparatus 10, such as on a screw 29, on the cut mechanism 37 or elsewhere. In other aspects, a manually trigger may be provided, e.g., by an operator that visually detects a head in the appropriate location.

After severing, a head is clamped if not already clamped, and clamp wheel 25 is controlled to rotate to re-position the clamped head proximal to a coring station. The coring station refers to a region or location proximal to coring mechanism 40. Coring mechanism 40, in one aspect, includes a coring drill attached to or secured on a movable platform. When a clamped head is positioned proximal the coring mechanism, and oriented with the core aligned with the drill as will be shown and described below, the platform and/or drill bit is controlled to move a controlled distance toward the clamped head and the drill is activated to remove the core of the head. Alternatively, or additionally, the clamp wheel may be configured to extend the clamp, and thus the clamped produce head, toward the coring mechanism.

After coring, the clamp wheel is controlled to rotate to reposition the clamped and cored head proximal to a drop station and the clamp is opened to release the cored head. The drop station refers to a region or location proximal to a receiving device such as a receiving conveyor.

FIGS. 5-14 illustrate operation of the picking and coring apparatus 10 according to one embodiment in more detail.

FIG. 2b shows a start position of apparatus 10 for a picking a coring cycle. As shown in FIG. 2b, lift arm 30 is in a raised position. In operation, as apparatus 10 moves along the soil bed, righting mechanism 29 receives a planted produce head and orients the stem, and thus also the core. Trigger mechanism 31 provides a signal when a righted head is positioned in the cut station. Receipt of the trigger signal (e.g., by a control system) initiates lowering of the lift arm 30, and rotation of the clamp wheel 25 as necessary, to position a clamp 27 proximal the cut station. FIG. 5 illustrates a clamp wheel in a lowered position so that a clamp is positioned proximal to a head to be picked (severed and clamped) according to one embodiment.

When a clamp is positioned proximal to a head, the head is clamped and severing commences. FIG. 6 illustrates operation of a severing mechanism according to one embodiment. Once severed, the clamped head is then repositioned proximal to a coring station. In one aspect, lift arm 30 raises the clamp wheel 25, and the clamp wheel rotates. FIG. 7 illustrates operation of the clamp wheel lifting while a clamp is holding a severed head according to one embodiment, and FIG. 8 illustrates operation of the clamp wheel lifting and rotating while a clamp is holding a severed head according to one embodiment. It should be appreciated that lift arm 30 may operate separately from, or simultaneously with, rotation of the clamp wheel to position the clamped head proximal to the coring station. For example, the lift arm may raise the clamp wheel and the clamp wheel may thereafter rotate, or the clamp wheel may first rotate and then the lift arm may thereafter raise the clamp wheel, or the clamp wheel may rotate while the lift arm raises the clamp wheel.

FIG. 9 illustrates operation of the clamp wheel with a clamped produce head positioned in the coring station, e.g., proximal to the coring drill, according to one embodiment. When properly positioned, the coring station activates and the core is removed, e.g., by activating and moving the platform and/or drill bit into the core. Alternatively, clamp wheel 25 may be configured to extend a clamp toward the coring station to facilitate removal of the core. FIG. 10 illustrates operation of the coring station according to one embodiment.

Once cored, the cored head is then re-positioned proximal a drop station, where it is then released. FIG. 11 illustrates operation of the clamp wheel rotating with a clamp holding a cored head according to one embodiment. FIG. 12 illustrates operation of the clamp wheel lowering with a clamp holding a cored head in the vicinity of a drop station according to one embodiment. FIG. 13 illustrates the position of the clamp wheel, and the clamp holding a cored head proximal to the drop station just before release of the cored head according to one embodiment. FIG. 14. illustrates release of the cored head onto the drop station.

In one aspect, another clamp may also be in position to clamp a planted head in the soil bed as a cored head is being released. It should be appreciated that in one configuration the geometry of the apparatus 10, and in particular clamp wheel 25, may be designed to match the known spacing of planted heads in soil bed 15. In this manner, when one clamp is in position to release a cored head, another clamp may be in position to clamp a head that is severed (or about to be severed).

There have been many experimental lettuce harvesters built in the past. To varying degrees they have been successful in capturing, and severing the head from the stem, and further delivering the cut head to a bulk container. In addition to performing picking and severing operations in an efficient manner, the present invention advantageously addresses removing the core. To accomplish this, a high degree of precision is generally required to efficiently remove the core and to not waste useful plant material. To achieve this precision, in certain aspects, the machine employs computer controlled positioning hardware and software to drive the hardware. In one embodiment, a control system including a processor or other intelligence module is provided to receive and provide timing and control signals to control operation of the various elements, e.g., activate cut mechanism 37, activate coring mechanism 40, activate lift arm 30, rotate clamp wheel 25, and activate (and release) clamps 27. For example, in one aspect, the control system is configured to receive a trigger signal indicating proper position of a head in a cut station and initiate a picking and coring operation. The control system is also configured to receive feedback signals from a follower device and provide signals to control the height of the righting screws 29. The control system may also include a memory module for storing operation code executable by the processor to control operation and timing of the various elements of apparatus 10.

In summary the operational steps according to certain aspects include:

Gather the leaning plant and return it to its upright growing position;

Clamp the plant when the vertical stem has arrived to a known trip point;

Sever the plant with a cutting device;

Move the plant clamping wheel up so that further movement will not be impeded by heads not yet harvested;

Rotate the clamping wheel (e.g., 120 degrees or some other interval) so that the head is proximal a coring station including a coring/plunge drill;

Initiate the core removing plunge drill process;

Rotate the clamping wheel (e.g., 120 degrees or some other amount); and

Release the cored head, e.g., for collection and disposal on a conveyor.

It should be understood that the above describes the steps for processing a single head using a three stage clamp device. While a first head is being cored, a second head may be clamped and severed at the clamping station. Also, while the first head is being released, a third head may be clamped and cut at the clamping station, while the second head is being cored. Thus, one, two or three heads may be harvested and cored in one revolution of a clamping wheel having three clamps. It should also be appreciated that a clamping wheel may comprise fewer than three clamps or more than three clamps so as to enable processing (at various stages) of fewer, or more, than three heads simultaneously.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for picking and coring produce heads, comprising:
   a chassis;
   a rotating clamp wheel having one or more clamps, each configured to hold a produce head;
   a lift arm that couples the clamp wheel with the chassis, wherein the lift arm is configured to controllably raise and lower the clamp wheel;
   a righting mechanism configured to position a planted produce head in a vertical orientation;
   a trigger mechanism that detects when a planted head is in a position to be severed;
   a severing mechanism configured to sever a planted produce head from a soil bed; and
   a coring mechanism configured to remove a core of a clamped produce head;
   wherein in operation, as the apparatus travels along a soil bed, the righting mechanism receives and orients planted produce heads, wherein when a planted head is in the position to be severed, the lift arm and clamp wheel are controlled to position a clamp proximal to the planted head, wherein the planted head is clamped and the severing mechanism severs the planted head from the soil bed, wherein the lift arm and clamp wheel re-position the clamped and severed head proximal to the coring mechanism, and wherein the coring mechanism automatically removes the core of the clamped and severed head.

2. The apparatus of claim 1, further including a motor and drive mechanism configured to propel or pull the chassis along the soil bed.

3. The apparatus of claim 1, wherein the severing mechanism includes one or more blades configured to sweep across or plunge into a planted produce head.

4. The apparatus of claim 1, wherein the severing mechanism includes one or more rotating blades.

5. The apparatus of claim 1, wherein the coring mechanism includes a coring drill.

6. The apparatus of claim 5, wherein the coring drill is configured to plunge into a clamped produce head positioned proximal to the coring mechanism.

7. The apparatus of claim 5, wherein the drill is fixed and wherein the clamp wheel is configured to extend the clamp holding the severed head proximal to the coring mechanism toward the coring drill.

8. The apparatus of claim 1, wherein the trigger mechanism includes one of a pass by trigger element and a visual sensor.

9. The apparatus of claim 1, further comprising a control system that provides timing and control signals to control the operation of the lift arm, clamp wheel, severing mechanism and coring mechanism.

10. The apparatus of claim 1, wherein the clamp wheel comprises three clamps, each clamp radially extending from a center of the clamp wheel at approximately 120° relative to the other clamps.

11. The apparatus of claim 1, wherein the righting mechanism includes one or more of a pair of righting screws, a linear drive chain and a rotating wheel.

12. A method of automatically picking and coring produce heads with a picking and coring apparatus configured to travel along a soil bed containing planted produce heads, the method comprising:
   receiving a produce head in a pair of righting screws configured to hold the produce head in a vertical orientation;
   detecting when the produce head is in a desired location; and thereafter automatically:
   clamping the produce head when the head is in the desired location;
   severing the produce head when the head is in the desired location;
   re-positioning the clamped produce head proximal to a coring mechanism;
   removing the core of the clamped produce head with the coring mechanism;

re-positioning the clamped and cored produce head proximal to a drop station; and releasing the cored produce head.

13. The method of claim 12, wherein the apparatus includes a rotating clamp wheel having at least one clamp, and wherein the steps of re-positioning include rotating the clamp wheel.

14. The method of claim 12, wherein the step of clamping occurs before the step of severing.

15. The method of claim 12, wherein the step of clamping occurs after the step of severing.

16. The method of claim 12, wherein the step of clamping occurs at about the same time as the step of severing.

17. The method of claim 12, wherein the apparatus includes a trigger mechanism that automatically detects when a head is in the desired location.

18. The method of claim 12, wherein the apparatus includes one or more severing blades configured to sever the produce head at a desired height above the soil bed.

19. The method of claim 18, wherein severing includes moving the one or more blades toward the produce head.

20. The method of claim 18, wherein the blades are fixed relative to the apparatus and wherein severing includes moving the apparatus such that the one or more blades sever the produce head.

21. The method of claim 12, wherein the apparatus includes a rotating clamp wheel having at least one clamp and a lift arm configured to lower and raise the clamp wheel, and wherein the steps of re-positioning include rotating the clamp wheel and lowering or raising the clamp wheel.

* * * * *